United States Patent [19]

Moulton

[11] 3,997,269
[45] Dec. 14, 1976

[54] SCALING APPARATUS WITH LINEARIZATION COMPENSATION
[75] Inventor: Clifford H. Moulton, Sunriver, Oreg.
[73] Assignee: Dyna-Tech Corporation, Portland, Oreg.
[22] Filed: Apr. 28, 1975
[21] Appl. No.: 572,221
[52] U.S. Cl. .............................. 356/167; 250/236; 250/560; 356/160
[51] Int. Cl.² ....................................... G01B 11/08
[58] Field of Search ................. 356/158, 160, 167; 250/236, 560; 178/7.6; 331/178

[56] References Cited
UNITED STATES PATENTS

| | | | |
|---|---|---|---|
| 2,492,155 | 12/1949 | Kandoian | 331/178 |
| 3,184,847 | 5/1965 | Rosen | 356/167 |
| 3,364,358 | 1/1968 | Ashworth | 356/167 |
| 3,514,713 | 5/1970 | Leyde | 331/14 |
| 3,681,706 | 8/1972 | Harzer | 331/178 |

Primary Examiner—John K. Corbin
Assistant Examiner—Wm. H. Punter
Attorney, Agent, or Firm—Kolisch, Hartwell, Dickinson & Stuart

[57] ABSTRACT

Scaling apparatus for measuring the dimensions of an article, such as a log, including a two-dimensionally curved parabolic mirror for viewing an article, and a constant-speed, rotary, electro-optical scanner located at the focal point of the mirror for scanning the mirror's view. Electrical pulse-generating circuitry in the apparatus operates during such scanning to generate, for each revolution of the scanner, a stored pulse count which directly indicates the side-to-side dimensions of a viewed article. Included in such circuitry is means for varying, in effect, the rate at which pulses are counted so as to correct the finally stored count for nonlinearity inherently encountered in the scanned view of the mirror.

12 Claims, 8 Drawing Figures

SCALING APPARATUS WITH LINEARIZATION COMPENSATION

BACKGROUND AND SUMMARY OF THE INVENTION

This invention pertains to electrical scaling apparatus which uses an electro-optically scanned parabolic viewing mirror, and a pulse-generating and counting circuitry, for measuring and indicating the dimensions of an article, such as a log. In particular, it relates to such apparatus which includes means operable during scanning of the mirror's view for varying, in effect, the rate at which pulses generated in the apparatus are counted, so that a final count may be produced which is corrected for nonlinearity inherently encountered during scanning of such a mirror, and which is directly indicative of the desired dimension of the viewed article.

For the purpose of explantion herein, an embodiment of the invention is described in conjunction with the diametral scaling of logs traveling into a sawmill, and with the presenting of a visual display of obtained scaling information.

Modern sawmills have become, in many instances, highly automated operations in which decisions respecting the cutting of a log into lumber are often made automatically. These decisions must be made so as to obtain maximum economic benefit from each log, which normally means not merely getting the most available lumber out of the log, but more especially, getting the maximum number of boards of the most economically rewarding sizes.

Decisions regarding cutting in such a mill are usually made on the basis of automatic, multi-axial, diametral scaling of a log as it travels toward the saws in the mill--such scaling feeding information into a computer, or the like, which determines how the saws will be applied to the log. Logs moving toward the saws are typically viewed repeatedly, or continuously, from different angles to determine their dimetral dimensions in different planes, from which dimensional information computer control is ultimately derived.

The present invention provides a scaling apparatus usable conveniently and accurately for making such measurements, and employing to this end a parabolic mirror for the purpose of viewing the dimensions of traveling logs. Such a mirror has the decided advantage of providing dimensional information which is independent of the mirror's distance from the viewed article, inasmuch as it provides at its focal point an image derived from rays received in parallel from the article. Operating at the mirror's focal point is a constant-speed, rotary, electrooptical scanner which scans the view of the mirror. As the scanner sweeps the mirror's view, and "sees" a log, pulse-generating means in the apparatus operates to supply a counter with pulses whose final count is intended to indicate directly the log's diameter as viewed. Featured, importantly, in the apparatus is means which varies the effective rate at which pulses are counted, so as to "linearize" the summed count, whereby each counted pulse, essentially, represents substantially the same diametral distance of a viewed log.

Varying of this counting rate herein, and as will become apparent, may be accomplished either infinitely or in steps, and may be based either on a following of the actual angular position of the scanner, or upon an accurate assumption as to its position based upon the running count of pulses which is produced as the scanner sweeps the mirror's view. Disclosed herein as a preferred embodiment of the invention is apparatus in which the counting rate is varied in discrete steps rather than infinitely, with this varying being under the control of circuitry which "watches" the cumulative count of pulses during a scanning sweep of the scanner as an indication of the scanner's angular position. such an approach has been found to have cost advantages, and its use has been found to produce highly accurate and very acceptable results.

Various other objects and advantages which are attained by the invention will become apparent as the description which follows is read in conjunction with the accompanying drawings.

Figure 8:
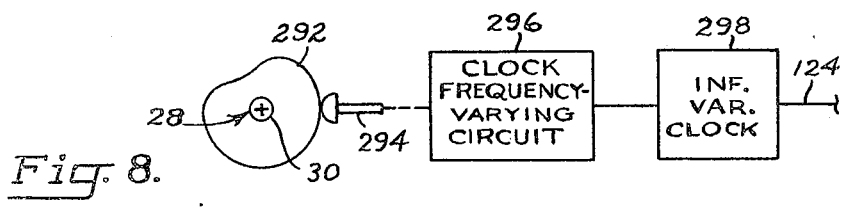

And, FIG. 8 shows a modification of the apparatus of the invention.

DETAILED DESCRIPTION OF THE INVENTION

1. Explanation of Terminology

Explaining briefly certain terminology which appears herein, various components shown in the drawings operate in response to a pair of voltag levels. More specifically, one of these levels corresponds to a certain positive voltage (e.g., a voltage above ground) which will be referred to hereinafter as a 1 state. The other level corresponds essentially to ground, and will be called hereinafter a 0 state. A terminal or a conductor having one of these voltage levels on it will be referred to as being in, or as having on it, either a 1 or a 0 state.

2. Description of Logic Gates Used

Among the components illustrated in the drawings which respond to the voltage levels just mentioned are a plurality of NAND-type logic gates having different numbers of inputs. In such a gate, with a 0 state on any input, the output is held in a 1 state. With all inputs in 1 states, the output of the gate is placed in a 0 state.

The operations of other components shown in the drawings which responds to, or generate, either of these two voltage levels will be explained as such components are encountered below.

3. Description of Components Shown in FIGS. 1 and 2

Figure 1:
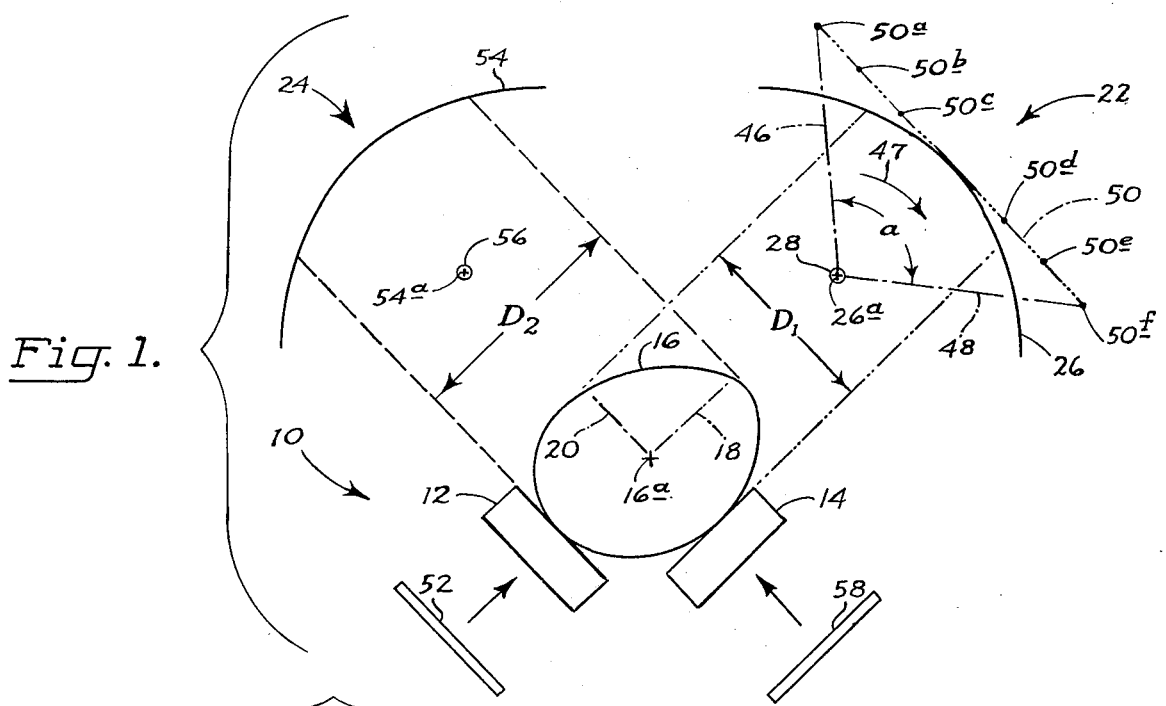
FIG. 1 is a simplified schematic view showing the end of a log on a conveyor moving into a sawmill, with this log being "viewed" along two different axes by a pair of scaling apparatuses constructed in accordance with the present invention.

Turning now to the drawings, and referring first to FIG. 1, indicated generally at 10 therein is a conveyor includng angled power-driven feed rollers, such as feed rollers 12, 14, which define a cradle for the transport of a log, such as log 16, toward the saws in a sawmill. The showing of conveyor 10 in this figure has been greatly simplified inasmuch as its details are of no particular importance. The conveyor and log 16 are viewed endo—the log's longitudinal axis being shown at 16a. Conveyor 10 operates to transport logs in a direction normal to and into the plane of FIG. 1.

As is clearly evident in FIG. 1, the log's cross-sectional configuration, as illustrated, is quite irregular, and certainly is far from true circular. In fact, its diametral dimensions vary infinitely as such dimensions are measured at progressively different radial planes intersecting the log. Such, of course, is true of many if not most logs which are processed by a sawmill. For example, the log's overall diametral dimension measured parallel to the axis of roller 12 is indicated at $D_1$ —this dimension being somewhat smaller than its diametral dimension, indicated at $D_2$, measured substantially parallel to the rotational axis of roller 14. These dimensions herein are measured at substantially right angles to one another.

Experience has shown that quite accurate information (from which sawing information may be derived) can be obtained from periodically, or continuously, viewing the diametral dimensions of a log along two axes which are at right angles to one another as a log is transported toward the saws in a mill. Diametral dimensions could, of course, be taken from many more and different angles, but such a practice becomes extremely costly, and does not significantly improve the accuracy of desired information. Hence, logs, such as log 16, which are carried on conveyor 10 herein are viewed along two axes which are at right angles to one another—these axes being shown in FIG. 1 generally at 18, 20. Previously mentioned dimension $D_1$ is measured with the log viewed along axis 18, and dimension $D_2$ is measured with the log viewed along axis 20.

Providing according to the present invention for scaling logs on conveyor 10 are two scaling apparatuses shown generally, and in greatly simplified form, at 22, 24. Apparatus 22 is for viewing a log along axis 18, and apparatus 24 is for taking such a view along axis 20. The two scaling apparatuses are substantially identical, and hence only apparatus 22 will be described in detail. The area along conveyor 10 wherein a log is viewed by these apparatuses is referred to herein as a work station.

Included within scaling apparatus 22 are a parabolic mirror, or reflector, 26, and a rotary scanning element, or scanner, 28 which forms part of an electro-optical scanning means in the apparatus.

Mirror 26 is a two-dimensionally curved mirror lying substantially within the plane of FIG. 1, and having a dimension (e.g., width) measured normal to this plane of about 2 inches. The mirror's overall length, measured along its curvature herein, is about 36 inches. Mirror 26 is substantially symetrically centered on previously mentioned viewing axis 18, with its focal point 26a also located on axis 18. This mirror performs in the usual fashion to furnish at its focal point an image derived from light rays which are received along lines paralleling axis 18. As a consequence, the exact distance between the mirror and the article which it views is not critical.

Figure 2:
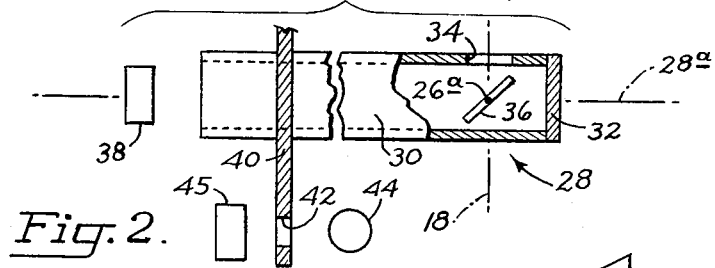
FIG. 2 is a simplified fragmentary schematic view of a rotary scanner, and associated equipment, used in one of the scaling apparatuses of FIG. 1.

Considering FIG. 2 along with FIG. 1, scanning element 28 herein is represented as comprising an elongated hollow tube 30, open at its left end in FIG. 2, and closed at its right end in this figure by a cap 32. Tube 30 might typically have an outside diameter of about 1 inch. (So as to relate FIG. 2 to FIG. 1, cap 32 faces the viewer in FIG. 1.) Provided in the wall of tube 30 adjacent the cap is a circular aperture 34 which exposes a planar mirror 36 that is suitably mounted in the tube at the location generally shown in FIG. 2. Mirror 36 is centered on the focal point, 26a, of mirror 26, which focal point is located at the intersection of previously mentioned viewing axis 18 and the longitudinal axis 28a of element 28. Axis 28a is normal to the plane of FIG. 1. As can be seen, axes 18, 28a are at substantially a right angle to one another. The plane of mirror 36 is at substantially a 45° angle to each of axes 18, 28a.

Suitably mounted adjacent the left end of tube 30 in FIG. 2 is a photodetector circuit 38 which is conventional in construction and which is fed optical information reflectd from mirror 36 along axis 28a. Circuit 38 also forms part of the scanning means previously mentioned in apparatus 22. The way in which this circuit performs will be explained more fully later.

Suitably joined to the outside of tube 30 is an opaque disc 40 having a single aperture 42. Disposed on opposite sides of disc 40, so as to be capable of communicating with one another through aperture 42, are a lamp 44, and a photodetector circuit 45 which is like previously mentioned circuit 38.

With apparatus 22 is use, element 28 is rotated about its axis 28a at the substantially constant speed of 1800 rpm, and in the direction indicated by arrow 47. The means which is provided for producing such rotation is entirely conventional in construction, and is therefore not illustrated. During each revolution of the element, mirror 36 scans the view of mirror 26 to pick up information respecting the side-to-side dimensions of any log then seen by mirror 26. In particular, a portion of each revolution of element 28 (approximately 100°) is defined herein as a scanning sweep portion of a revolution, and is indicated in FIG. 1 as being that portion of a revolution defined by angle a, bounded by dash-dot lines 46, 48. This scanning sweep portion, or scanning sweep, is symmetrical with respect to the center of mirror 26, and with respect to line 18.

In the embodiment of apparatus 22 which is now being described, a scanning sweep of element 28 may be thought of as being divided into subportions, or spans. In particular, it will be noted that previously mentioned dash-dot lines 46, 48 intersect a dash-triple-dot line 50 which extends tangent to the center of mirror 26. Line 46 intersects line 50 at a point 50a, and line 48 intersects line 50 at a point 50f. Points 50a, 50f therefore, mark along line 50 the opposite ends of a scanning sweep. Also marked along line 50 are four other points, 50b, 50c, 50d, 50e, which, together with points 50a, 50f, divide line 50 into sections which "mark" the subportions mentioned above of a scanning sweep. Considering their respective distances along line 50 from point 50a, point 50b is about 5 inches away, point 50c about 10 inches, 50d about 22 inches, point 50e about 27 inches, and point 50f about 32 inches.

Imagining for a moment that lines, like lines 46, 48, are drawn between focal point 26a and points 50b, 50c, 50d, 50e, line 46 along with the line which would extend to point 50b, as well as line 48 together with the line which would extend to point 50e, would define outer end portions of a scanning sweep. The two lines which would extend to points 50b, 50c, as well as the two lines that would extend to points 50d, 50e, would define inner end portions of a scanning sweep. Finally, the two lines that would extend to points 50c, 50d would define a central span of a scanning sweep.

The reason for viewing a scanning sweep as being divisible into subportions, and the reasons for the specific divisions just defined, will be explained more fully later.

Cooperating with scaling appartus 22 is a lamp 52 which is positioned so as to illuminate the opposite side of a log from that viewed by apparatus 22. Lamp 52, in other words, casts a shadow of the log onto mirror 26.

Touching briefly on apparatus 24, included within this apparatus are a parabolic mirror 54 which is like mirror 26, and a rotary scanning element 56 which is like element 28 and which turns about its longitudinal axis. Such axis is normal to the plane of FIG. 1, and intersects the focal point 54a of mirror 54. A lamp 58 cooperates with apparatus 24 in much the same manner as does lamp 52 with respect to apparatus 22.

Explaining now briefly the respective operations of photodetector circuits 38, 45, and considering first the operation of the latter, once during each revolution of element 28, circuit 45 is exposed momentarily to lamp 44. Circuit 45 is provided with a suitable output (not shown) which, in the absence of the circuit's viewing lamp 44 remains normally in a 0 state. When circuit 45 "sees" the lamp, its output terminal is placed immediately in a 1 state—returning again to a 0 state after the lamp is again concealed from the circuit. Thus, once per revolution of element 28 a positive voltage pulse is provided on the output of circuit 45. This pulse, and more specifically, the leading or positive-going edge of this pulse, is referred to herein as a marker pulse, and is employed to indicate the beginning of a scanning sweep by element 28. Lamp 44 and circuit 45 are so positioned that they will communicate with one another at the same instant that mirror 36 is positioned to take a view of what is reflected by mirror 26 along line 46. The way in which this marker pulse is used will be explained later.

Circuit 38 also has an output (not shown) which normally is in a 0 state. When, during a scanning sweep of element 28, mirror 36 first sees an edge of a viewed log (e.g., the beginning of a log's shadow on mirror 26), the output of circuit 38 switches to a 1 state in which state it remains until mirror 36 sees the opposite side of the log (e.g., the end of the shadow). the way in which this performance is used will also be explained later.

Details of circuits 38, 45 have been omitted inasmuch as such circuits, and their operations, are well known to those skilled in the art. Photodetector circuits, like circuits 38, 45, are associated in a similar manner with scanning element 56 in apparatus 24.

4. The Circuitry of FIG. 3

Figure 3:
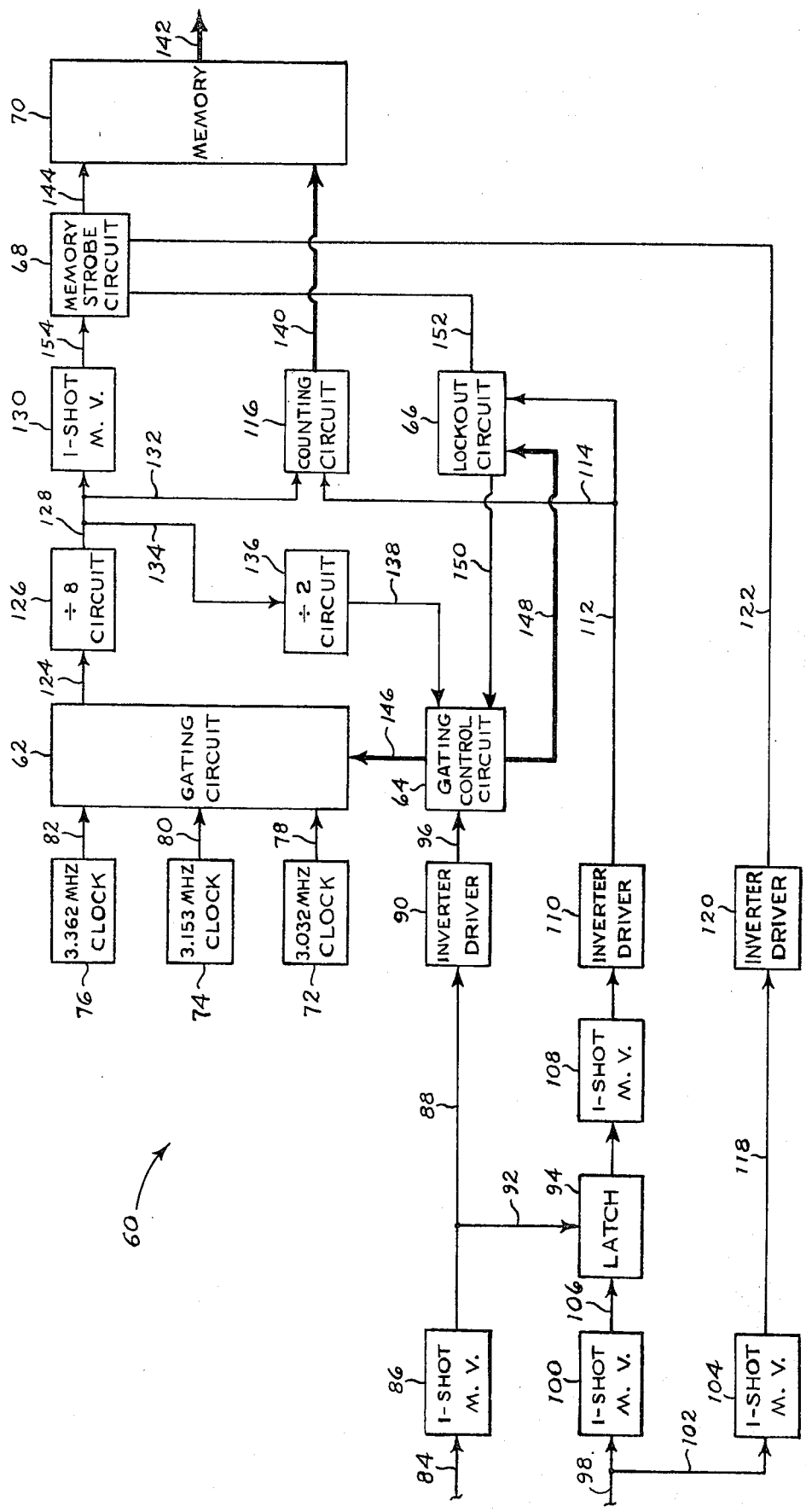
FIG. 3 is a block diagram of circuitry as contemplated herein which is fed information from the scanner of FIG. 2, from which information a log's diametral dimension, in one plane, is determined.

Indicated generally at 60 in FIG. 3, and shown therein in block form, is circuitry which receives information from photodetector circuits 38, 45. From such information, this circuitry produces a stored pulse count, as contemplated herein, which directly indicates the side-to-side dimensions of a log viewed by mirror 26 during a scanning sweep of element 28.

Included within circuitry 60 are a gating circuit 62, a gating control circuit 64, a lockout circuit 66, a memory strobe circuit 68, and a memory 70. Also included within this circuitry are three clock pulse generators, or sources of electrical voltage pulses, shown at 72, 74, 76. Clock 72 when it operates produces squarewave voltage pulses (e.g., pulses which alternate the voltage on the output of the clock between 0 and 1 states) at a frequency at 3.032 mHz., clock 72 at a frequency of 3.153 mHz., and clock 76 at a frequency of 3.362 mHz.

Each clock operates with a 50% duty cycle. As can be seen, the outputs of these three clocks are connected to three inputs of gating circuitry 62 via conductors 78, 80, 82. The clocks and gating circuit are referred to collectively herein as a changeable-frequency pulse source. Gating control circuit 64 is also referred to as a frequency-change means.

The output of photodetector circuit 45 is connected through a conductor 84 to the input of a conventional one-shot multivibrator 86 whose output is connected through a conductor 88 to the input of a conventional inverter driver circuit 90. The output of multivibrator 86 is also connected through conductor 88 and a conductor 92 to the set input of a conventional latch circuit, or latch, 94. Multivibrator 86 normally maintains a 1 state on its output, and hence on conductors 88, 92. With a state change from 0 to 1 on its input, multivibrator 86 produces a negative-going pulse lasting about 10-microseconds. In other words, the multivibrator switches the voltage at its output from 1 to 0 for about this time period, after which it returns a 1 state to its output. The output of inverter driver 90 is connected through a conductor 96 to an input of gating control circuit 64. The voltage on conductor 96 is at all times exactly the inverse of the voltage on conductor 88. Driver 90 functions both as an inverter, and as a means for providing ample driving current in conductor 96 for components within circuit 64.

The output of photodetector circuit 38 is connected via a conductor 98 to the input of a one-shot multivibrator 100, and via conductor 98 and a conductor 102 to the input of another one-shot multivibrator 104. Multivibrator 100 is substantially identical to multivibrator 86. Multivibrator 104 is similar to multivibrators 86, 100 except that it responds to a state change from 1 to 0 on its input to produce a 10-microsecond, negative-going pulse on its output.

The output of multivibrator 100 is connected through a conductor 106 to the reset input of latch 94. The output of this latch is connected directly to the input of another one-shot multivibrator 108 whose output is connected to an inverter driver 110 which is substantially identical to previously mentioned driver 90. Multivibrator 108 is substantially identical to multivibrators 86, 100. The output of driver 110 is connected through a conductor 112 to an input of lockout circuit 66, and through conductor 112 and a conductor 114 to the reset terminal of a digital pulse counting circuit, or counter, shown in block form at 116.

The output of multivibrator 104 connects through a conductor 118 with the input of an inverter driver 120 which is substantially the same in construction as the two other inverter drivers previously mentioned. The output of driver 120 is connected to an input of memory strobe circuit 68 through a conductor 122.

As will be more fully explained later, gating circuit 62 is controlled herein to determine, at any given time, from which of the three clock pulse generators pulses are supplied at the output of the gating circuit which is connected to a conductor 124. Conductor 124 feeds the input of a conventional divide-by-eight circuit shown in block form at 126. The output of circuit 126 connects through a conductor 128 with the input of a one-shot multivibrator 130, connects through conductor 128 and a conductor 132 with the counting input of circuit 116, and connects through conductor 128 and a conductor 134 to the input of conventional divide-by-two circuit, shown in block form at 136. The output of circuit 136 feeds an input of gating control circuit 64 through a conductor 138.

Circuit 126 performs in the usual manner to divide by eight the number of pulses which it receives at its input—providing at its output one pulse for every eight pulses received at its input. Circuit 136 perfoms in a similar manner. Multivibrator 130 normally maintains its ouput in a 0 state—switching this condition to a 1 state for a period of about 0.2-microseconds each time that it experiences a state change from 0 to 1 on its input.

With respect to circuit 116 a state change from 0 to 1 on its reset terminal places the circuit in a zero-count condition. With a 0 state existing on the reset terminal, each state change from 1 to 0 on its counting input is counted by the circuit. Circuit 116 herein, which is shown as a single block in FIG. 3, actually takes the form of four conventional, cascade-connected, binary-coded-decimal (BCD)counters, one of which, an input counter, directly receives pulses via conductor 132. This input counter counts units of pulses, the next counts tens of pulses, the next hundreds of pulses, and the fourth thousands of pulses. Each of these four counters is provided with the usual four outputs, the voltage states on which indicate the pulse count stored in the particular counter. BCD counters which may be used for this purpose are widely available and familiar to those skilled in the art. Such counters, as is well known, are capable of counting recurrently from "zero" to "nine."

The four outputs of each of the four BCD counters just discussed are connected to conductors in a 16-conductor cable—this cable forming an output cable from circuit 116, and being represented by the heavy line shown at 140 in FIG. 3. The conductors in each group of four conductors in cable 140 which is associated with the four outputs of a BCD counter are connected to the usual four inputs of a conventional strobable, multi-input/multi-output binary latch, of which there are four employed herein to make up memory 70. Each such latch may, for example, be a device like that made by Texas Instruments, and designated as device No. SN 7475. Thus, the outputs of the "units" BCD counter are connected to the four inputs of the latch in memory 70 which may be thought of as the "units" latch. Similarly, the outputs of the "tens," "hundreds" and "thousands" BCD counters are connected to the inputs of latches which may be thought of as the "tens," "hundreds" and "thousands" latches, respectively, in memory 70. Each such latch includes the usual four outputs, which are connected to conductors in a 16-conductor output cable 142 provided for memory 70.

The latches in memory 70 are used herein in a noninverting mode. Accordingly, with the latches energized, each of the four outputs in a latch always has on it exactly the same voltage state as its single associated input (of the latch) had the last time that the latch was strobed. Thus, when the latches are strobed, the four outputs of the "units" latch will be placed in the same respective voltage states as the four outputs of the "units" BCD counter, and so on for the "tens," "hundreds" and "thousands" latches. Such operation is well understood by those skilled in the art.

Extending between memory strobe circuit 68 and memory 70 is a conductor 144, which conductor is connected directly to the usual strobe input of each of the four latches making up the memory. With a voltage state change from 1 to 0 occurring on conductor 144, the latches in memory 70 are simultaneously "strobed."

Circuit 116 and memory 70 are not gone into in any greater detail herein, inasmuch as the components, construction and operation which have just been described for them are conventional, and are well understood by those skilled in the art.

Completing a description of what is shown generally in FIG. 3, connecting one plurality of outputs of gating control circuit 64 with a plurality of inputs of gating circuit 62 are conductors (still to be described) making up a multiconductor cable 146. Another multiconductor cable 148 connects another plurality of outputs of the gating control circuit with a plurality of inputs of lockout circuit 66. One output of circuit 66 is connected through a conductor 150 to an input of gating control circuit 64, and another output of the lockout circuit is connected through a conductor 152 to an input of circuit 68. Finally, the output of multivibrator 130 is connected through a conductor 154 with an input of circuit 68.

5. Gating Control Circuit 64

Figure 4:
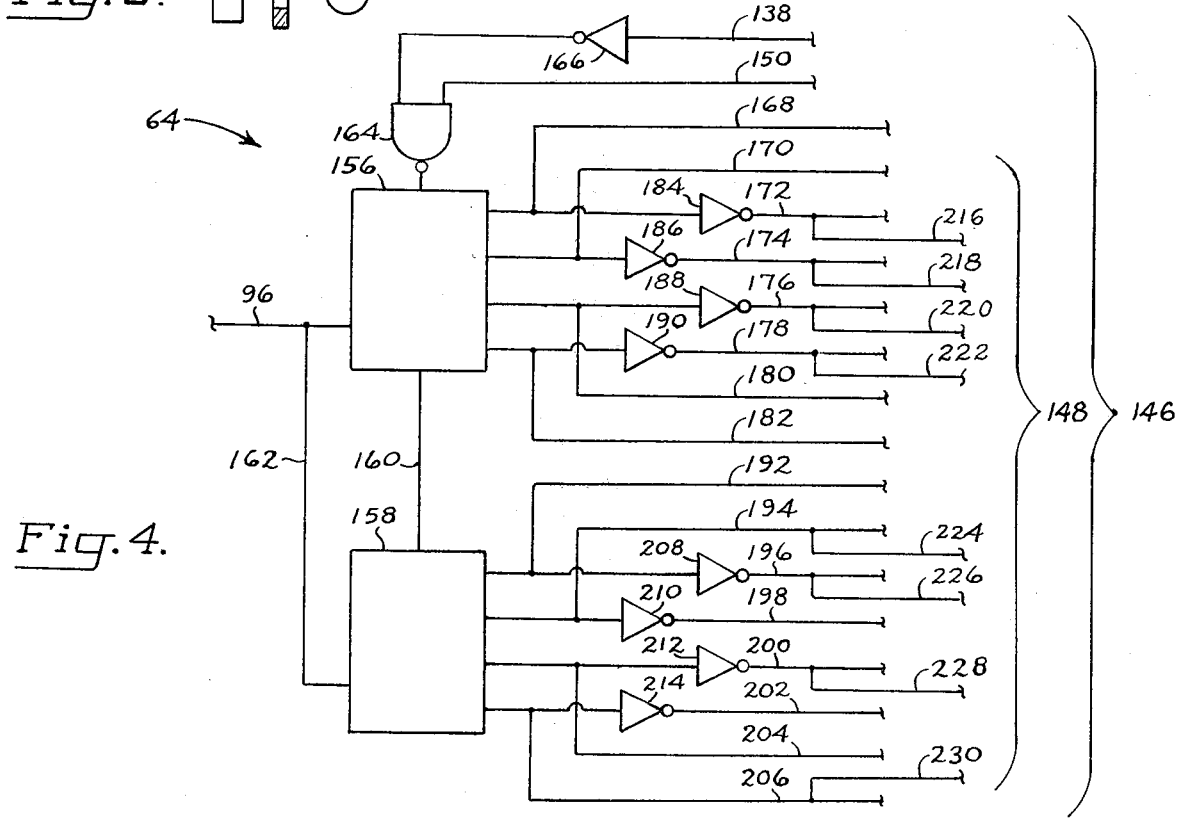
FIGS. 4, 5, 6, and 7 are detailed circuit diagrams, in block form, illustrating, respectively, a gating control circuit, a gating circuit, a lock-out circuit, and a memory strobe circuit, used in the circuitry of FIG. 3.

FIG. 4 illustrates the details of the gating control circuit. Included within this circuit are two conventional, cascade-connected binary counters 156, 158. Such counters are capable of counting recurrently from "zero" to "fifteen." Counters 156, 148 are cascade-connected through a conductor shown at 160. Counter 156 may be thought of as a 37 units" counter, and counter 158 as a "tens" counter.

Conductor 96 connects with the reset terminal of counter 156, and connects through a conductor 162 with the reset terminal of counter 158. Conductor 160 connects with the counting input of counter 158 in such a manner as to provide a counting pulse to this input each time that counter 156 counts up from a count of "fifteen."

The counting input of counter 156 is connected to the output of a two-input NAND gate 164, one input of which is connected to conductor 150, and the other input of which is connected to the output of an inverter 166 whose input is connected to conductor 138.

The four outputs of counter 156 are associated with eight of the conductors (previously mentioned) which form part of cable 146. These eight conductors are shown in FIG. 4 at 168–182 (even numbers only), inclusive. Progressing downwardly along the outputs of counter 156, the "first bit" output is connected directly to conductor 168, and through an inverter 184 to conductor 172. The "second bit" output is connected directly to conductor 170 and through an inverter 186 to conductor 174. The "third bit" output connects directly with conductor 180, and through an inverter 188 with conductor 176. And finally, the "fourth bit" output connects directly with conductor 182, and through an inverter 190 with conductor 178.

Similarly, the four outputs of counter 158 are associated with the other eight conductors included within cable 146. These other eight conductors are shown at 192–206 (even members only) inclusive. The "first bit" output of counter 158 connects directly with conductor 192, and through an inverter 208 with conductor 196. The "second bit" output connects directly with conductor 194, and through an inverter 210 with conductor 198. The "third bit" output is connected directly to conductor 204, and through an inverter 212 to conductor 200. The "fourth bit" output of counter 158 connects directly with conductor 206, and through an inverter 214 with conductor 202.

Connected to conductors 172, 174, 176, 178, 194, 196, 200, 206 are eight conductors shown at 216–230 (even numbers only), respectively, which eight conductors make up previously mentioned cable 148.

Counters 156, 158 are referred to collectively herein as a frequency-control counter. The conductors and inverters connected to the outputs of counters 156, 158 (exclusive of the conductors in cable 146) are referred to herein both as interconnecting means, and as addressing means.

6. Gating Circuit 62

Figure 5:
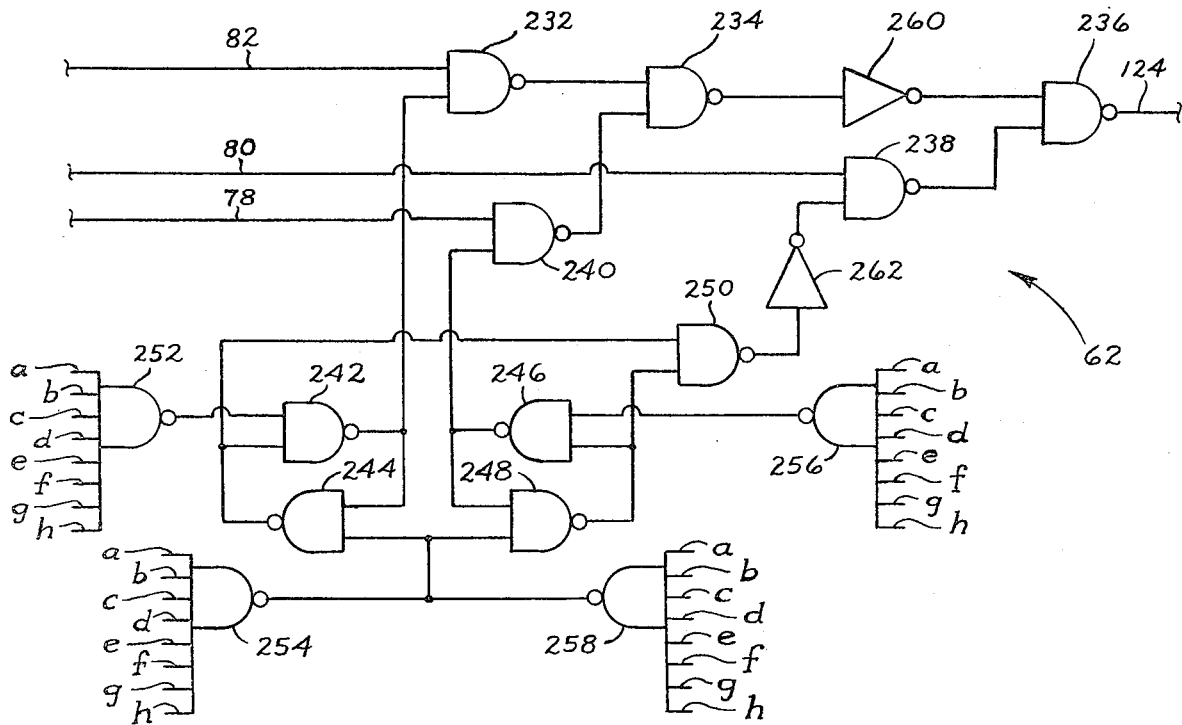

Turning now to FIG. 5, gating circuit 62 includes a plurality of two-input NAND gates shown at 232–250 (even numbers only), inclusive. Also included within the gating circuit are four eight-input NAND gates 252, 254, 256, 258, and a pair of inverters 260, 262.

The upper inputs of gates 232, 238, 240 are connected to previously mentioned conductors 82, 80, 78, respectively. The lower input of gate 232 is connected to the output of gate 242, and to the upper input of gate 244. The lower input of gate 238 connects with the output of inverter 262 whose input connects with the output of gate 250. The lower input of gate 240 is connected to the output of gate 246 and to the upper input of gate 248.

The outputs of gates 232, 240 are connected to the upper and lower inputs, respectively, of gate 234. The output of the latter is connected to the input of inverter 260, whose output is connected to the upper input of gate 236. The lower input of gate 236 connects directly with the output of gate 238, and the output of gate 236 connects with previously mentioned conductor 124.

The upper input of gate 250 connects with the lower input of gate 242, and with the output of gate 244. The lower input of gate 250 connects with the lower input of gate 246, and with the output of gate 248. The lower inputs of gates 244, 248 are connected together, and further, are connected to the outputs of gates 254, 258 which are also connected together. The upper inputs of gates 242, 246 are connected to the outputs of gates 252, 256, respectively.

The eight inputs of each of the eight-input NAND gates in circuit 62 are designated by the letters a-h, inclusive. Connections between these inputs and other components are described herein rather than shown, inasmuch as a showing of such connections would needlessly complicate FIG. 5. The a-h inputs of gate 252 are connected, respectively, to conductors 168, 170, 180, 178, 196, 198, 200, 206. The a-h inputs of gate 254 are connected, respectively, to conductors 168, 174, 182, 192, 198, 200, 202. The a-h inputs of gate 256 are connected, respectively, to conductors 172, 170, 176, 178, 192, 194, 200, 202. Finally, the a-h inputs of gate 258 are connected to conductors 172, 170, 180, 182, 196, 194, 204, 202, respectively.

Within the gating circuit, gates 242, 244 work together as a conventional set/reset latch circuit. Such also is true with respect to gates 246, 248. As will be more fully explained shortly, both with respect to cause and effect, the output conditions of these four gates are under the control of the output conditions of the four eight-input NAND gates.

7. Lockout Circuit 66

Figure 6:
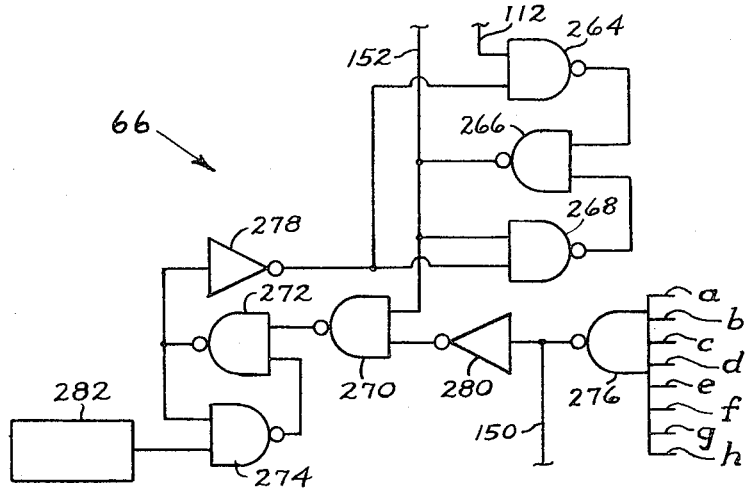

Turning now to FIG. 6, making up lockout circuit 66 are six two-input NAND gates 264, 266, 268, 270, 272, 274, an eight-input NAND gate 276, and a pair of inverters 278, 280. Also included within the lockout circuit is a pulsing circuit shown in block form at 282.

The upper input of gate 264 is connected to previously mentioned conductor 112, and the lower input of this gate is connected both to the output of inverter 278 and to the lower input of gate 268. The output of gate 264 connects with the upper input of gate 266, whose other input is connected directly to the output of gate 268. Previously mentioned conductor 152 connects as shown with the output of gate 266, with the upper input of gate 268, and with the upper input of gate 270.

Completing a description of the connections shown in FIG. 6, previously mentioned conductor 150 connects both with the output of gate 276 and with the input of inverter 280. The output of this inverter is connected to the lower input of gate 270, whose output is connected to the upper input of gate 272. The lower input of gate 272 connects directly with the output of gate 274. The upper input of gate 274 connects directly both with the output of gate 272, and with the input of inverter 278. The output of pulsing circuit 282 connects directly with the lower input of gate 274.

As is the case the four eight-input NAND gates shown in FIG. 5, the eight inputs of gate 276 are designated a-h, inclusive. These eight inputs are connected to conductors 172, 174, 176, 178, 196, 200, 206, respectively.

Within the lockout circuit, gates 266, 268 perform together as a conventional set/reset latch circuit. So also do gates 272, 274.

Pulsing circuit 282 has been shown herein only in block form, inasmuch as it is entirely conventional in construction, and in fact, may be made in many different ways. The specific pulsing circuit employed herein produces, at the rate of about one pulse per second, successive negative-going voltage spikes on its output, and hence on the lower input of gate 274. In other words, the ouput of the pulsing circuit is normally in a 1 state, and is switched about once each second momentarily to a 0 state.

8. The Memory Strobe Circuit

Figure 7:
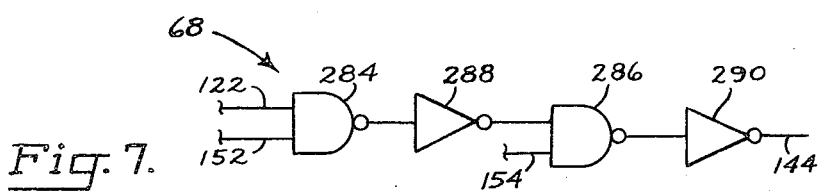

Memory strobe circuit 68 is shown in FIG. 7. Included in this circuit are two two-input NAND gates 284, 286, and two inverters 288, 290. The upper and lower inputs of gate 284 are connected to conductors 122, 152, respectively. The output of this gate connects with the input of inverter 288, whose output is connected to the upper input of gate 286. The lower input of gate 286 connects with previously mentioned conductor 154, and the output of this gate connects directly with the input of inverter 290. The output of inverter 290 connects with conductor 144.

9. Operational Description

Explaining now how the apparatus so far described performs, certain initial conditions must be understood. To begin with, let us assume that all equipment in the apparatus is properly energized, with scanning element 28 rotating, and lamps 44, 52 lit. Let us also assume that the angular position of element 28 is such that the "view" of mirror 36 within the element is somewhere outside of scanning sweep angle a. Let us further assume that a log, such as log 16, is disposed in a position on conveyor 10 to be viewed by, and is being viewed by, mirror 26.

Under such circumstances, clocks 72, 74, 76 are all operating, with each supplying pulses at its particular frequency on the respective ones of conductors 78, 80, 82 to gating circuit 62. The outputs of photodetector circuits 38, 45 are initially 0, and hence conductors 84, 98, 102 (see FIG. 3) are also initially in 0 states. The outputs of multivibrators 86, 100, 104, 108, and of latch 94, are initially in 1 states, and the outputs of drivers 90, 110, 120 are initially in 0 states. As a consequence, conductors 96, 112, 114, 122 are initially in 0 states.

Considering conditions within lockout circuit 66, as will become more fully apparent shortly, the output of eight-input NAND gate 276 is initially in a 0 state. The reason for this is that there now exists, and is stored within counters 156, 158 in the gating control circuit, a count which has previously indicated the end of the last previous scanning sweep of scanning element 28, this count being that which produces a 1 state on each of the eight inputs of gate 276. The particular count which produces this result is that which causes all of the outputs of counters 156, 158, except for the "second" and "fourth bit" outputs of counter 158, to be in 0 states. This particular count herein is a count of (160).

Both inputs of gate 274 are initially in a 1 state, such also being true for the output of gate 272 and for the input of inverter 278. A 0 state thus exists on the output of inverter 278, with the consequence that the outputs of gates 264, 268 are locked in 1 states. The output of gate 266 is locked in a 0 state, which state is applied to conductor 152. The output of gate 270 is initially locked in a 1 state by virtue of the 0 state on conductor 152.

As a result of the 0 state on conductor 150, the output of gate 164 in the gating control circuit is locked in a 1 state. Accordingly, counters 156, 158 are not operating at this time, but rather are in a fixed condition storing the count (previously mentioned) which resulted in placement of a 0 state on the output of gate 276 in the lockout circuit. Thus, regardless of any pulses which might be received at this time from circuit 136 via conductor 138, counters 156, 158 are not responsive to these pulses.

Looking now within gating circuit 62, for reasons which will become more fully apparent shortly, the outputs of gates 252, 254, 256, 258 are all initially in 1 states. The outputs of gates 242, 248 are locked in 1 states, and the outputs of gates 244, 246 are locked in 0 states.

With the output of gate 242 in a 1 state, a 1 state also exists on the lower input of gate 232, which means that clock pulses supplied over conductor 82 from clock 76 are passed through (in inverted form) to the output of this gate, and hence to the upper input of gate 234. With a 0 state on the output of gate 246, which 0 state is also applied to the lower input of gate 240, the output of gate 240 is locked in a 1 state. Hence, pulses supplied from clock 72 over conductor 78 are blocked from passing through gate 240. The 1 state on the output of gate 240 is applied to the lower input of gate 234, with the consequence that pulses which are applied to the upper input of gate 234 pass through this gate to the input of inverter 260. Inverter 260 inverts these pulses, and applies them to the upper input of gate 236.

Considering the initial conditions regarding gate 250, the upper and lower inputs of this gate are initially in 0 and 1 states, respectively. As a consequence, the output of this gate is locked in a 1 state, which results in a 0 state being applied by inverter 262 to the lower input of gate 238. The result of this situation is that the ouput of gate 238 is locked in a 1 state, and gate 238 is thus unable to pass through pulses received over conductor 80 from clock 74. The 1 state on the output of gate 238 is applied to the lower input of gate 236, with the result that there initially are applied to conductor 124 clock pulses derived from clock 76. It will be apparent that such pulses on conductor 124 have the same phase as pulses on conductor 82. It will also be noted that what is initially made available on conductor 124 are pulses at the highest of the three mentioned clock frequencies.

With such pulses existing on conductor 124, circuit 126 applies pulses at ⅛ the frequency of clock 76 to conductors 128, 132, 134, and circuit 136 supplies pulses to conductor 138 at 1/16th the frequency of clock 76.

The leading edge of each pulse on conductor 128 causes multivibrator 130 to produce a positive-going pulse (e.g., a state change from 0 to 1, and then back to 0) on its output—each pulse lasting about 0.2-microseconds. However, and with reference to initial conditions within the memory strobe circuit, these pulses on conductor 154 have no further effect, inasmuch as the upper input of gate 286 is held in a 0 state, locking its output in a 1 state. This situation results from the fact that conductors 122, 152 initially apply 0 states to both inputs of gate 284—the output of this gate then being locked in a 1 state which locks the ouput of inverter 288 in a 0 state. With the output of gate 286 in a 1 state, conductor 144 is held in a 0 state.

Pulses supplied to conductor 132 are counted by the BCD counters within circuit 116, but such counting is of no consequence at this time, inasmuch as the output of the memory strobe circuit is locked initially in a 0 state.

Pulses supplied over conductor 138 are of no consequence at this time, since gate 164 in the gating control circuit is initially held closed by virtue of the 0 state applied to it via conductor 150.

Let us assume for a moment, what will be explained more fully shortly, that locked on the outputs of the latches which make up memory 70 is either a group of voltage states indicating a count representing the diameter of a log viewed during the last scanning sweep of element 28, or if no such viewing took place, a group of 0 voltage states indicating a zero-diameter log (e.g., no log).

The initial conditions which have just been described remain unchanged until the beginning of a scanning sweep. It will be recalled that such a sweep begins with mirror 36 "looking" along line 46 at the view taken by mirror 26, accompanied by exposure of lamp 44 to photodetector circuit 45. The beginning of a scanning sweep is marked by a positive-going pulse on conductor 84 from circuit 45—the leading edge of which pulse produces a 10-microsecond negative-going pulse on conductors 88, 92. Such a pulse on conductor 88 results, through operation of driver 90, in resetting of counters 156, 158 in the gating control circuit to zero-count conditions. The pulse on conductor 92 results in setting of latch 94, whereupon a 0 state is placed and held on its output.

Setting of latch 94 has no further consequence at this time. However, resetting of counters 156, 158 results in the placement of a 1 state on the output of gate 276 in the lockout circuit, and hence on conductor 150. No change initially takes place on the outputs of any of the other eight-input NAND gates. The result of this action is that gate 164 in the gating control circuit is opened, whereupon counters 156, 158 begin counting pulses supplied via circuit 136 and conductor 138. It will be recalled that these pulses are initially derived from the high-frequency clock (76), and in particular occur at 1/16th the frequency of such clock. Thus, as a scanning sweep begins, counting within counters 156, 158 is at a rate determined by clock 76.

Let us digress for a moment from a pure sequential explanation of what occurs during a scanning sweep with a log being viewed, in order to explain, first, fully the operations of the gating circuit and of the gating control circuit. On the count within counters 156, 158 reaching a count of (25), the output conditions of these counters are such as to cause the output of eight-input NAND gate 254 to switch (during such count) to a 0 state. With the frequency of clock 76 which has been selected herein, and with element 28 rotating at the speed mentioned earlier, such a count will be reached with mirror 36 in the scanning element looking toward point 50b shown along line 50 in FIG. 1. In other words, this condition will arise on completion of what has previously been described as an outer end portion (e.g., the first outer end portion) of a scanning sweep.

Placement of a 0 state on the output of gate 254 has no effect on the latch circuit made up of gates 246, 248, but does have an effect upon the latch circuit made up of gates 242, 244. In particular, the outputs of gates 242, 244 switch to and become locked in 0 and 1 states, respectively. With a 0 state on the output of gate 242, gate 232 is closed to pulses from clock 76. With a 1 state on the output of gate 244, the conditions on the output of gate 250 and the output of inverter 262 switch to 0 and 1 states, respectively—opening gate 238 to passages of pulses from clock 74—the intermediate-frequency clock. 1 states now exist on both inputs of gate 234, with the result that a 1 state also exists on the upper input of gate 236. Hence, there are now supplied to conductor 124, as the scanning element begins the first inner end portion of a scanning sweep, pulses at a frequency of clock 74. These pulses have the same phase as the pulses from the clock.

The operation just described in no way interrupts the counting of pulses by counters 156, 158, which now continue to count, but at a rate (e.g., a slower rate) determined by clock 74.

On the count of (50) being reached within counters 156, 158, the output conditions on the outputs of these counters are such as to cause the output of eight-input NAND gate 256 to switch (during such count) to a 0 state. This has no effect on the latch circuit made up of gates 242, 244, but does affect the latch circuit made up of gates 246, 248. In particular, the outputs of gates 246, 248 switch to and become locked in 1 and 0 states, respectively.

A 1 state on the output of gate 246 opens 240 to the passage of pulses from low-frequency clock 72. These pulses are then passed through gate 240, and thence through gate 234 and inverter 260 to the upper input of gate 236. With a 0 state on the output of gate 248, the output of gate 250 and the output of inverter 262 are returned to the conditions which they initially had, with gate 238 then closed to the passage of pulses from clock 74. There thus now exist on conductor 124 pulses in phase with and at the same frequency as pulses from clock 72.

The count just mentioned which resulted in the change just described has been selected to occur at the instant that mirror 36 looks toward point 50c on line 50 in FIG. 1—e.g., that point marking the end of the first inner end portion of a scanning sweep. Thus, as element 28 begins the central portion of a scanning sweep, counting within counters 156, 158 is at an even slower rate, as determined by the lowest frequency clock 72.

On mirror 36 reaching an angular position where it takes a view toward point 50d, the count of (110) is reached in counters 156, 158, whereupon the output of gate 258 is switched (during such count) to a 0 state, which action results in closure of gate 240, and in reopening of gate 238 for the supply of pulses from clock 74 to conductor 124. The way in which this occurs will now be obvious from the operations already discussed within the gating circuit. Similarly, on mirror 36 taking a view toward point 50e, the output of gate 252 in the gating circuit switches momentarily to a 0 state, resulting from the count of (135) having been reached by counters 156, 158. This operation results in closure of gate 238, and reopening of gate 232 for the supply of pulses from clock 76 to conductor 124.

Finally, on the previously mentioned count of (160) being reached within counters 156, 158, which count will be reached with mirror 36 taking a view toward point 50f, the output of gate 276 in the lockout circuit is placed in a 0 state, whereupon a 0 state is returned to conductor 150. Such action results in reclosing of gate 164 in the gating control circuit, whereupon no further pulses may be counted by counters 156, 158.

It will thus be apparent that each time that scanning element 28 moves in a scanning sweep, the gating circuit and the gating control circuit work together to supply to conductor 124 pulses whose frequency changes from time to time at different specific points in the sweep. In particular, and during the outer end portions of a scanning sweep, pulses are supplied by high-frequency clock 76. During the two inner end portions of a scanning sweep, pulses are supplied by intermediate-frequency clock 74. Pulses during the central portion of a scanning sweep are supplied by low-frequency clock 72. At all times, the counting which takes place within counters 156, 158, which counting, significantly, determines the times that frequency changes occur, is always under the control of the particular one of clocks 72, 74, 76 then supplying pulses to conductor 124. The defining of a scanning sweep herein as including several portions is believed to be a useful way of discussing the frequency changes which occur on conductor 124 throughout a scanning sweep.

It will thus be apparent that supplied to conductors 128, 132 are pulses whose frequencies, throughout a scanning sweep, change in direct proportion to, and at the same time as, changes in the frequency of pulses on conductor 124.

This changing of frequencies on conductor 124, and hence on conductors 128, 132, is a key feature of the present invention, inasmuch as it is that feature which introduces correction or compensation for nonlinearily inherently encountered during scanning of the view of mirror 26. By making the frequency changes described, it is possible to interpret, quite accurately, each pulse supplied at the ouput of the gating circuit as a direct indication of substantially the same diametral dimension of a log viewed by mirror 26. While frequencies other than those specifically chosen herein may be used, and while a different total number of frequencies may be used, the three specific frequencies selected have been found to produce, economically, extremely satisfactory results. In particular, the operation which has just been described has been found capable of yielding diametral dimensional information of a log to an accuracy within 0.01-inches. Such accuracy is more than adequate for an installation such as a sawmill, as well as for many other kinds of installations.

Returning now to a description of the overall operation, and considering what else takes place in the apparatus during a scanning sweep, after generation of the marker pulse on conductor 84, on mirror 36 later "seeing" the side of a log (e.g., the beginning of a log's shadow on mirror 26), circuit 38 changes the voltage on its output from 0 to 1. This state change also occurs on conductors 98, 102, and hence at the inputs of multivibrators 100, 104. A 1 on the ouput of circuit 38 constitutes a scanning signal herein.

The state change from 0 to 1 on conductor 102 has no effect on multivibrator 104. However, the similar state change applied to the input of multivibrator 100 causes this multivibrator to produce a 10-microsecond negative-going pulse on its output, which pulse is applied to the reset terminal of latch 94. The negative-going leading edge of this pulse resets latch 94, whereupon the ouput of the latch changes from 0 to 1. Such a change causes multivibrator 108 to produce a negative-going pulse at its output, which results in a positive-going pulse being placed on conductors 112, 114.

It might be noted at this point that with resetting of latch 94, no subsequent state change on conductor 98 can have any effect on the output state of the latch, until the latch is again set at the beginning of the next successive scanning sweep.

Continuing, it will be observed that the BCD counters which make up circuit 116 have been counting pulses on conductor 132 since energizing of circuitry 60. The positive-going pulse, and particularly the leading edge of this pulse, which has just been described as produced on conductor 114, causes resetting of these BCD counters to zero-count conditions. Until the time that the beginning edge of a log is "seen," it makes no difference what total count is stored in circuit 116, since "seeing" of the beginning of a log results in resetting of the BCD counters to zero-count conditions. Beginning, then, from this zero-count situation, circuit 116 again begins counting pulses supplied it via conductor 132. Circuit 116 presents, on the conductors contained within cable 140, a running count indication of the total count of pulses stored in it at any given time. It will particularly be noted that the rate at which circuit 116 counts pulses is, as was the case with counters 156, 158, determined by which of the three clocks is supplying pulses through the gating circuit.

Thus, progressing from the instant in time when the beginning side of a log is first seen, a running count takes place in circuit 116 which count, because of the linearizing effected by the gating and gating control circuits, is directly interpretable as an indication of measured log diameter.

Considering what takes place within the lockout circuit on the occurrence of the positive pulse on conductor 112, and assuming that prior to the receipt of this pulse, pulsing circuit 282 has applied a momentary 0 state to the lower input of gate 274, then, gates 272, 274 are in conditions with 0 and 1 states are applied to the lower inputs of gates 264, 268. The outputs of gates 266, 268 are in 0 and 1 states, respectively.

The positive pulse on conductor 112, further, places the upper input of gate 264 momentarily in a 1 state, which causes the output of this gate to switch momentarily to a 0 state. Such switching causes the outputs of gates 266, 268 to switch to and become locked in 1 and 0 states, respectively. As a consequence, conductor 152 is placed in a 1 state.

This situation remains until either of two things occurs, namely, (1) the output of gate 276 (FIG. 6) is placed in a 0 state, which will not occur until the end of a scanning sweep, or (2) pulsing circuit 282 places an instantaneous 0 state on the lower input of gate 274, which operation occurs once during each second. With respect to the operation of circuit 282, it will be obvious that between these 0 state voltages which it applies to gate 274, scanning element 28 makes thirty scanning sweeps. Thus, after each generation of a negative-going spike by circuit 282, and progressing from the beginning of each scanning sweep thereafter, there is a period of time of about 1/30th of a second during which conductor 152 remains in a 1 state.

Referring to FIG. 7, with placement of a 1 state on conductor 152, gate 284 is opened to any change which may occur on conductor 122. The output of the gate, however, and so long as conductor 122 remains in a 0 state, stays in a 1 state.

With the exception of one particular type of circumstance which will be discussed shortly, no further changes take place until the opposite side of a log's shadow on mirror 26 is "seen" by mirror 36. Throughout continued scanning of the view of mirror 26, and progressing from the time that mirror 36 first "saw" the beginning edge of a log, the BCD counters in circuit 116 continue to count pulses on conductor 32 at rates which change as the scanning element enters each one of the several different portions of a scanning sweep. Until the opposite side of a log is seen, the running count within the BCD counters is, hence, at all times directly interpretable as a measure of that portion of a log's diameter which has been viewed so far.

On the scanning element detecting the opposite side of a log (e.g., the end of the log's shadow on mirror 26), the voltage state at the output of circuit 38 switches from 1 to 0, which state change also occurs on conductors 98, 102. This state change on conductor 98 has no effect. However, the state change on conductor 102 causes multivibrator 104 to produce a 10-microsecond negative-going pulse on conductor 118 which is applied to the input of driver 120. Consequently, driver 120 applies a 10-microsecond positive-going pulse to conductor 122, which pulse is applied to the upper input of gate 284 in the memory strobe circuit shown in FIG. 7.

It will be recalled that at this point in time a 1 state exists on conductor 152. Accordingly, the 1 state applied to conductor 122 causes the output of gate 284 to switch to a 0 state, which action results in the application of a 1 state to the upper input of gate 286. The lower input of gate 286 will at this time be eight in a 0 or a 1 state, depending upon whether or not, within the last 0.2-microseconds, the leading edge of a pulse on conductor 128 (FIG. 3) has caused firing of multivibrator 130. In any event, during the time that a 1 state remains on the upper input of gate 286, there will be several firings of multivibrator 130 causing several successive momentary 1 states to be applied via conductor 154 to the lower input of gate 286.

It will be evident that each time that a positive-going pulse is applied through conductor 154 to the lower input of gate 286, a corresponding positive-going pulse is applied to conductor 144, and hence to the strobe inputs of each of the four latches in memory 70. The negative-going edge of each such pulse on conductor 144 strobes the latches, causing them to place on their 1. Apparatus for determining the locations of, and relative spacing between, the opposite sides of an article in a work station regardless of the exact position of the article in the station, said apparatus comprising
   a parabolic reflector positioned adjacent said station for viewing an article disposed therein,
   electro-optical scanning means including a substantially constant-speed rotary scanning element located adjacent the focal point of said reflector, said scanning means, with rotation of said scanning element throughout a scanning sweep portion of a revolution of the element, being constructed to generate an electrical scaning signal indicative of the locations in said station of the opposite sides of a viewed article,
   a changeable-frequency source of electrical pulses,
   frequency-change means operatively connected both to said scanning means and to said source for causing, during movement of said scanning element throughout a scanning sweep portion of a revolution, changes in the operating frequency of the source, whereby throughout the scanning sweep portion the time interval between each pulse produced by the source is directly relatable substantially the same distance in said station viewed by the reflector and scanned by the element during the interval,
   said frequency-change means comprising a frequency-control counter for contiuously counting the pulses produced by said source throughout a scanning sweep portion of a revolution of said scanning element, and means operatively interconnecting said changeable-frequency source and said frequency-control counter for determining the operating frequency of the source in accordance solely with the particular absolute count then stored in said frequency-control counter, and
   a pulse counter operatively connected to said source and to said scanning means, operable during a scanning sweep portion of a revolution of said element, to accumulate and store a count of only those pulses which are produced by the source during generation by said scanning means of a scanning signal, regardless of the time relations of the beginnings and endings of a scanning sweep portion of a revolution of said element and of the generation of a scanning signal.

2. The apparatus of claim 1, wherein said frequency-change means is constructed to change the operating frequency of said source whereby such frequency is lower with said scanning element moving in a central span of a scanning sweep portion of a revolution than it is with the element moving in an end span of said sweep portion.

3. Apparatus for determining the locations of, and relative spacing between, the opposite sides of an article in a work station regardless of the exact position of the article in the station, said apparatus comprising
   a parabolic reflector positioned adjacent said station for viewing an article disposed therein,
   electro-optical scanning means including a substantially constant-speed rotary scanning element located adjacent the focal point of said reflector, said scanning means, with rotation of said scanning element throughout a scanning sweep portion of a revolution of the element, being constructed to generate an electrical scanning signal indicative of the locations in said station of the opposite sides of a viewed article,
   a changeable-frequency source of electrical pulses changeable to operate at a plurality of different preselected frequencies, said source including a plurality of generators of electrical pulses each operable to produce such pulses for the source at a different one of said different preselected frequencies,
   a frequency-change circuit operatively connected both to said scanning means and to said source for causing, during movement of said scanning element throughout a scanning sweep portion of a revolution, predetermined changes, from one to another of said preselected frequencies, in the operating frequency of the source, whereby throughout the scanning sweep portion the time interval between each pulse produced by the source is directly relatable to substantially the same distance in said station viewed by the reflector and scanned by the element during the interval,
   said frequency-change circuit comprising a frequency-control counter for continuously counting pulses produced for the source throughout a scanning sweep portion of a revolution of said scanning element, and addressing means operatively interconnecting said generators and said frequency-control counter for selecting which one of said generators at any given time provides pulses for said source solely in accordance with the particular absolute count then stored in said frequency-control counter, and
   a pulse counter operatively connected to said source and to said scanning means, operable during a scanning sweep portion of a revolution of said element to accumulate and store count of only those pulses which are produced for source during generation by said scanning means of a scanning signal, regardless of the time relations of the beginnings and endings of the scanning sweep portion of a revolution of said element and of the generation of a scanning signal.

4. The apparatus of claim 3, wherein said frequency-change circuit is constructed to change the operating frequency of said source whereby such frequency is lower with said scanning element moving in a central span of a scanning sweep portion of a revolution than it is with the element moving in an end span of said sweep portion.

5. The apparatus of claim 3, wherein said addressing means is constructed to select, with said scanning element moving in a central span of a scanning sweep portion of a revolution, a generator having a lower frequency than that of a generator which it selects with the element moving in an end span of said sweep portion.

6. Apparatus for producing a pulse count indicative of the dimension (in one plane) of an article located in a work station regardless of the exact position of the article in the station, said apparatus comprising
   a parabolic reflector positioned adjacent said station for viewing an article located therein,
   scanning means including a rotary scanning element disposed adjacent the focal point of said reflector, said scanning means being constructed, with rotation of said element to sweep the view of said reflector, to generate a scanning signal indicative of noting by said element of two opposite sides of an article viewed by said reflector,
   a changeable-frequency source of electrical pulses, outputs duplicates of the voltage states then existing on the four outputs of the corresponding associated BCD counters in circuit 116. The last such strobing action which is effective is that which occurs just prior to return of the upper input of gate 286 to a 0 state. Such return occurs at the end of the 10-microsecond pulse produced on conductor 122. At such time, there will be presented at the outputs of the four latches voltage states duplicative of the voltage states on the outputs of the four BCD counters in circuit 116, which voltage states indicate the total count which existed within circuit 116, as the opposite side of a log was seen.

Regardless of when the opposite side of a log is seen, once it has been seen, no further strobing of the latches can occur, and hence, they remain in a condition storing, or memorizing, and presenting at their outputs, voltage states directly interpretable as an indication of measured log diameter.

With the particular clock frequencies and divisions thereof used herein, and with the selected rotational speed of element 28: the final count during a scanning sweep stored within the "units" latch will directly indicate hundredths of inches of log diameter; the final count stored within the "tens" latch will directly indicate tenths of inches of log diameter; the count stored within the "hundreds" latch will directly indicate units of inches of log diameter; and the final count stored within the "thousands" latch will directly indicate tens of inches of log diameter.

As was mentioned earlier, there is one type of circumstance, other than seeing of the opposite side of a log, which can result in the transmission of a positive pulse from circuit 38 to conductors 98, 102. This circumstance, in the particular form of apparatus disclosed herein, results when an especially bright spot on the viewed side of a log is seen by mirror 36. Although it will not be common that such a bright spot will be observed, should such a spot be seen, it will result in strobing of the latches in memory 70 in the manner just described. However, it will be apparent that this "premature" strobing of the latches, while introducing therein log diametral dimensional information, will not cause any error in the final presentation of the latches, inasmuch as the latches will again be strobed as the true opposite side of the viewed log is seen.

The apparatus of the invention described so far has taken the form of a system suitable for visual display of log diametral information. In such a system, it is not practical, considering the relatively high rotary speed of the scanning element, to present a new visual display with each scanning sweep of the element. Pulsing circuit 282 in lockout circuit 66 functions to permit a new visual display to be presented only once per second, at which rate the human eye can easily discern changing information. Simply by increasing the pulsing rate of circuit 282, diametral information can be provided at the outputs of the latches in memory 70 as frequently as each scanning sweep of element 28. This more rapid rate of information presentation would, of course, be more suitable for the input of diametral information into automatic processing equipment, such as a computer.

There is thus proposed a system for scaling the diameter of an object, such as a log, wherein the distance of the viewed log from the viewing apparatus is not a critical factor, and regardless of this distance, a very highly accurate measurement may be made. The parabolic mirror used in the instant apparatus enables such viewing-distance-independence. However, this kind of mirror introduces inherent nonlinearity problems in the view which it presents at its focal point. Thus, featured in the apparatus of the invention is the novel circuitry which has just been described that, in effect, divides the scanning sweep of the scanner into portions wherein clock pulses of preselected different frequencies are used in an order whereby each successive pulse, essentially, is directly indicative of scanning of the same diametral dimension of a viewed log.

As has been mentioned above, multiple clock frequencies switched into and out of effective operation at appropriate selected times has been found to produce an economical, practical and accurate compensator for nonlinearity. However, it is appreciated that other approaches may be used. For example, a modification of the system is shown in FIG. 8 in which there is suitably mounted on tube 30 in scanning element 28 a cam 292 that acts on a cam follower shown at 294. The cam follower is suitably ganged to a clock frequency-varying circuit 296 whose output is connected to a conventional voltage-controlled, infinitely variable clock 298. Clock 298, for example, might be a clock capable of varying infinitely from a low frequency somewhat below that of clock 72, to a higher frequency somewhat above that of clock 76. Circuit 296 might typically be a circuit capable of producing at its output an infinitely variable DC voltage which, when applied to the appropriate input of clock 298, causes the output frequency of this clock to vary throughout its range. In FIG. 8, circuit 296 and clock 298 are constructed to produce the kinds of operations just mentioned.

Cam 292 is shaped to produce, with rotation of the scanning element, movement of follower 294 to effect infinite frequency variation of clock 298 throughout a scanning sweep of the scanning element. In this arrangement, the initial frequency of the clock is high at the beginning of each scanning sweep, diminishing in frequency with movement of the scanning element into the central portion of a scanning sweep, and rising again in frequency as the scanning element moves toward and through the end of a scanning sweep. The rate of frequency variation, and the specific relationship of instantaneous frequency to angular position of the scanning element, are matters of choice.

Other ways of varying the rate at which pulses are counted in circuit 116 throughout a scanning sweep, so as to linearize results, are of course possible. Such changing of the counting rate within circuit 116, however accomplished, is a key feature in obtaining linearized, accurate dimensional information.

It is thus believed obvious that the apparatus of the invention fulfills all of the objectives set forth for it earlier, and achieves all of the advantages ascribed to it herein. Various modifications may become apparent to those skilled in the art. For example, whereas back lighting has been illustrated and described herein for a viewed article, front lighting might also be used, if desired. Further, and in connection with the arrangement shown in FIG. 8, other types of infinitely variable clocks (e.g., other than voltage-variable) may be used.

Thus, while a preferred embodiment, and modifications, of the invention have been described herein, it is appreciated that other variations and modifications may be made without departing from the spirit of the invention.

It is claimed and desired to secured by Letters Patent:

means operatively connected both to said scanning means and to said source for changing the frequency of the latter substantially in accordance with the angular position of the former's scanning element during generation by the scanning means of a scanning signal, whereby during such a signal the time interval between each pulse produced by the source is directly relatable to substantially the same distance in said station viewed by the reflector and scanned by the element during the interval, said means for changing the frequency of said source comprising a frequency-control counter for continuously counting pulses produced by the source during sweeping by said element of the view of said reflector, and means operatively interconnecting said source and said frequency-control counter for determining, at any given time, the operating frequency of the source in accordance solely with the particular absolute count then stored in said frequency-control counter, and a pulse counter operatively connected to said source and to said scanning means, operable during a scanning sweep portion of a revolution of said element to accumulate and store a count of only those pulses which are produced by the source during generation by said scanning means of a scanning signal, regardless of the time relations of the beginnings and endings of the scanning sweep portion of a revolution of said element and of the generation of a scanning signal.

7. The apparatus of claim 6, wherein the means for changing the frequency of said source is constructed to make such a change whereby such frequency is lower with said scanning element sweeping a central portion of the view of said reflector than it is with the element sweeping other portions of the view of said reflector.

8. In apparatus for determining the spacing between the opposite sides of an article in a work station regardless of the exact position of the article in a work station, which apparatus includes a parabolic reflector positioned adjacent said station for viewing an article disposed therein, and an electro-optical scanning means including a substantially constant-speed rotary scanning element located adjacent the focal point of said reflector, said scanning means, with rotation of said scanning element throughout a scanning sweep portion of a revolution of the element, being constructed to generate an electrical scanning a signal indicative of the location is said station of to opposite sides of a viewed article:

a changeable-frequency source of electrical pulses;

frequency-change means operatively connected both to said scanning means and to said source for causing, during movement of said scanning element throughout a scanning sweep portion of a revolution, changes in the operating frequency of the source, whereby throughout the scanning sweep portion the time interval between each pulse produced by the source is directly relatable to substantially the same distance in said station viewed by the reflector and scanned by the element during the interval said frequency-change means comprising a frequency-control counter for continuously counting pulses produced by the source during the scanning sweep portion of a revolution of said scanning element, and means operatively interconnecting said source and said frequency-control counter for determining, at any given time, the operating frequency of the source in accordance solely with a particular absolute count then stored in said frequency-control counter; and a pulse counter operatively connected to said source and to said scanning means, operable during a scanning sweep portion of a revolution of said element to accumulate and store a count of only those pulses produced by the source during generation by said scanning means of a scanning signal, regardless of the time relations of the beginnings and endings of the scanning sweep portion of a revolution of said element and of the generation of a scanning signal.

9. The apparatus of claim 8, wherein said frequency-change means is constructed to change the operating frequency of said source whereby such frequency is lower with said scanning element moving in a central span of a scanning sweep portion of a revolution than it is with the element moving in an end span of said sweep portion.

10. The apparatus of claim 8, wherein said changeable-frequency source is changeable to operate at a plurality of different preselected frequencies, and said frequency-change means is constructed to cause predetermined changes, from one to to other of said preselected frequencies, in the operating frequency of the source.

11. The apparatus of claim 10, wherein said frequency-change means is constructed to change the operating frequency of said source whereby such frequency is lower with said scanning element moving in a central span of a scanning sweep portion of a revolution than it is with the element moving in an end span of said sweep portion.

12. In apparatus for determining the spacing between the opposite sides of an article in a work station regardless of the exact position of the article in the station, which apparatus includes a parabolic reflector positioned adjacent said station for viewing an article disposed therein, and an electro-optical scanning means including a substantially constant-speed rotary scanning element located adjacent the focal point of said reflector, said scanning means, with rotation of said scanning element throughout a scanning sweep portion of a revolution of the element, being constructed to generate an electrical scanning signal indicative of the locations in said station of the opposite sides of a viewed article:

a changeable-frequency source of electrical pulses, changeable to operate at a plurality of different preselected frequencies, and including a plurality of generators of such pulses each operable to produce pulses for the source at a different one of said preselected frequencies;

frequency-change means operatively connected both to said scanning means and to said source for causing, during movement of said scanning element throughout a scanning sweep portion of a revolution, predetermined changes in the operating frequency of the source, from one to the other of said preselected frequencies, in the operating frequency of the source, whereby throughout the scanning sweep portion the time interval between each pulse produced for the source is directly relatable to substantially the same distance in said station viewed by the reflector and scanned by the element during the interval, said frequency-change means comprising a frequency control counter for continuously counting the pulses produced for the source throughout a scanning sweep portion of a revolution of said scanning element, and addressing means operatively interconnecting said generators and said frequency-control counter for selecting which one of said generators, at any give time, provides pulses for said source in accordance solely with the particular absolute count then stored in said frequency-control counter; and a pulse counter operatively connected to said source and to said scanning means, operable during a scanning sweep portion of a revolution of said element to accumulate and store a count of only those pulses produced by the source during generation by said scanning means of a scanning signal, regardless of the time relations of the beginnings and endings of the scanning sweep portion of a revolution of said element and of the generation of a scanning signal.

* * * * *

UNITED STATES PATENT AND TRADEMARK OFFICE
CERTIFICATE OF CORRECTION

PATENT NO. : 3,997,269
DATED : December 14, 1976
INVENTOR(S) : Clifford H. Moulton It is certified that error appears in the above-identified patent and that said Letters Patent are hereby corrected as shown below:

Column 19, line 24, insert --to-- after relatable

Column 20, line 66, insert --the-- after "of"

Column 21, line 39, delete "a work" and put in --the--

Column 21, line 48, omit "a"

Column 21, line 49, "is" should be --in--

Column 21, line 49, "to" should be --the--

Signed and Sealed this

Twenty-ninth Day of March 1977

[SEAL]

Attest:

RUTH C. MASON
Attesting Officer

C. MARSHALL DANN
Commissioner of Patents and Trademarks